United States Patent [19]
Dickerson

[11] Patent Number: 6,072,820
[45] Date of Patent: Jun. 6, 2000

[54] CHEMICAL OXYGEN IODINE LASER GAIN GENERATOR SYSTEM

[75] Inventor: Robert A. Dickerson, Woodland Hills, Calif.

[73] Assignee: The Boeing Company, Seal Beach, Calif.

[21] Appl. No.: 09/061,598

[22] Filed: Apr. 16, 1998

[51] Int. Cl.[7] .............................. H01S 3/095; H01S 3/20; H01S 3/04; H01S 3/22; C01B 13/00
[52] U.S. Cl. .............................. 372/51; 372/89; 372/51; 372/34; 372/55; 372/701; 372/104; 423/579; 423/279
[58] Field of Search .............................. 372/51, 89, 34, 372/55, 701, 104; 423/579, 272

[56] References Cited

U.S. PATENT DOCUMENTS

| | | | |
|---|---|---|---|
| 4,206,429 | 6/1980 | Pinsley et al. | 331/94.5 |
| 4,225,831 | 9/1980 | Ault et al. | 331/94.5 |
| 4,230,996 | 10/1980 | Cook, Jr. | 331/94.5 |
| 4,307,842 | 12/1981 | Morris | 239/557 |
| 4,653,062 | 3/1987 | Davis et al. | 372/89 |
| 4,780,880 | 10/1988 | Dickerson | 372/60 |
| 5,516,502 | 5/1996 | Dickerson | 423/579 |
| 5,624,654 | 4/1997 | Clendening, Jr. et al. | 423/579 |
| 5,658,488 | 8/1997 | Lonergan et al. | 252/186 |
| 5,658,535 | 8/1997 | Thayer, III et al. | 422/129 |
| 5,693,267 | 12/1997 | Beshore et al. | 261/142 |
| 5,859,863 | 1/1999 | Clendening, Jr. et al. | 372/39 |
| 5,870,422 | 2/1999 | Florentino et al. | 372/89 |
| 5,974,072 | 10/1999 | Hartlove et al. | 372/89 |

OTHER PUBLICATIONS

M V Zagidullin, V D Nikolaev, M I Svistun, N A Khavatov, N I Ufintsev; Highly efficient supersonic chemical oxygen—iodine laser with a chlorine flow rate of 10 mmol $s^{-1}$, Quantum Electronics 27(3) 195–199 (1997).

V N Azyazov, M V Zagidullin, V D Nikolaev, V S Safonov; Chemical oxygen—iodine laser with mixing of supersonic jets, Quantum Electronics 27(6) 477–480 (1997).

Valeri D. Nikolaev; Comparative analysis of the different methods of preparing active medium in supersonic COIL, P.N. Lebedev Physical Institute, Samara Branch, Chemical & Electrical Discharge Lasers Laboratory, 221, Novosadovaya Str., 443011, Samara, Russia.

*Primary Examiner*—Frank G. Font
*Assistant Examiner*—Delma R. Flores Ruiz
*Attorney, Agent, or Firm*—Lawrence N. Ginsberg

[57] ABSTRACT

The COIL gain generator system includes a reactor for producing singlet delta oxygen and a mechanism for mixing high momentum diluent with the singlet delta oxygen and with iodine for producing a high momentum, low static temperature mixture of the singlet delta oxygen, diluent and iodine. The singlet delta oxygen and the iodine react to produce excited iodine atoms which can lase efficiently due to the low static temperature and can, after lasing, recover to high pressure in a diffuser due to the high momentum of the mixture. This provides the capability of using a chemical pump which allows a completely sealed system with no outside exhaust.

9 Claims, 1 Drawing Sheet

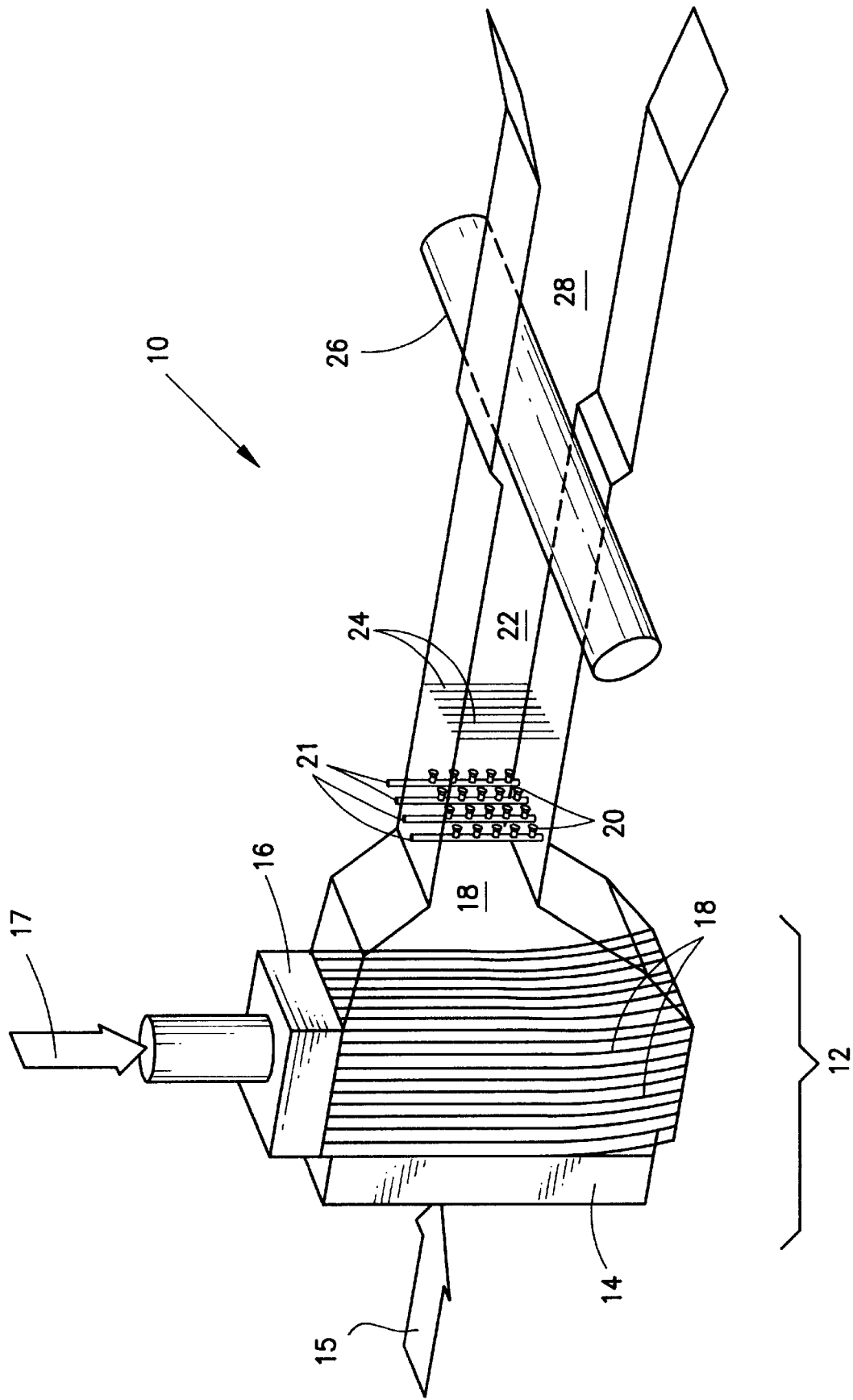

CHEMICAL OXYGEN IODINE LASER GAIN GENERATOR SYSTEM

BACKGROUND OF THE INVENTION

1. Field of the Invention

The present invention relates to chemical oxygen iodine laser's (COIL) and more particularly to a coil gain generator which provides enhanced efficiency, flow capacity and pressure recovery.

2. Description of the Related Art

COIL (Chemical Oxygen Iodine Laser) devices produce laser optical energy from energy stored in a form of oxygen known as singlet delta oxygen, ($O_2(^1\Delta)$). The $O_2(^1\Delta)$ is typically produced in a gas liquid contact reactor (see e.g., U.S. Pat. No. 5,658,535, U.S. Pat. No. 5,624,654 and U.S. Pat. No. 5,516,502) from gaseous chlorine ($Cl_2$) and liquid basic hydrogen peroxide (BHP). The BHP is a mixture of hydrogen peroxide and a strong base such as KOH. The gaseous $Cl_2$ is absorbed into the BHP and reacts to form the highly energetic $O_2(^1\Delta)$ which diffuses out of the BHP into the gaseous phase. The $O_2(^1\Delta)$ has a strong tendency to be quenched by pooling the energy of two $O_2(^1\Delta)$ molecules to form an even more energetic specie known as oxygen singlet sigma, ($O_2(^1\Sigma)$). The $O_2(^1\Sigma)$ quickly returns to the $O_2(^1\Delta)$ state, with the overall process resulting in a net loss of the equivalent stored energy of one $O_2(^1\Delta)$ molecule. As a consequence of this pooling loss process, the reactors producing $O_2(^1\Delta)$ must be operated at low $O_2(^1\Delta)$ pressure and short gas residence time to avoid excessive losses. The need for short residence time encourages the designer to use fast gas velocity in the reactor, but carryover of liquid with the $O_2(^1\Delta)$ product gas sets a limit on the maximum gas velocity which can be used. The need for low $O_2(^1\Delta)$ pressure encourages the designer to employ low pressure reactors. However, a vacuum system is needed to exhaust all laser exhaust. The lower the reactor pressure, the lower the vacuum pressure must be, leading to a larger and more costly vacuum system. Typically, the $Cl_2$ reactant is mixed with a diluent to raise the overall pressure of the reactor while keeping the $O_2(^1\Delta)$ pressure low. To minimize gas density in the reactor, a low molecular weight diluent is selected, and it is most often helium.

Downstream of the reactor producing $O_2(^1\Delta)$, iodine is mixed into the oxygen (see e.g., U.S. Pat. No. 4,653,062). Usually the iodine is in the form of diatomic molecules, ($I_2$). The iodine is quickly dissociated into iodine atoms by a process involving $O_2(^1\Delta)$. Iodine atoms have an elevated energy level very near to the difference in energy levels of $O_2(^1\Delta)$ and ground state oxygen ($O_2{}^3\Sigma$). The energy of $O_2(^1\Delta)$ is quickly interchanged back and forth with the iodine atoms in a process which is near to equilibrium. The excited iodine atoms, often designated as I*, are the lasing specie used to extract energy from the mixed gases. The equilibrium fraction of iodine atoms in the I* state increases as the gas temperature is lowered. The I* specie is unfortunately quenched to the ground state very quickly, with conversion of the energy to heat, by several species, the specie of most concern being water vapor (from the BHP) which accompanies $O_2(^1\Delta)$ effluent from the reactor. The I* quenching issue is most important in the region between the $I_2$ injection location and the start of the laser cavity (the "dissociation zone"), Consequently, the length of the dissociation zone is kept as small as practical by the COIL designer to minimize the losses due to I* quenching. The issue is less pronounced in the laser cavity because the lasing process reduces fraction of I* and hence the rate of quenching is reduced.

Because the equilibrium toward I* is more pronounced at low temperature, there is a power extraction efficiency advantage to running the laser cavity at low temperature. This is typically achieved by accelerating the gases to supersonic Mach numbers. As higher Mach numbers are selected, the pressure in the cavity must be lowered (rather than increasing the gas source pressure), since the available $O_2(^1\Delta)$ pressure is limited by the need to keep the reactor producing $O_2(^1\Delta)$ at low pressure as discussed above. The major disadvantage of higher Mach numbers is the impact on the vacuum system needed to operate the laser. Generally after laser energy extraction the high Mach number gases are passed into a diffuser where pressure is recovered from the high Mach number momentum. The typical COIL operates at a supersonic cavity Mach number of about 2, which is a compromise between higher laser power extraction at low temperatures corresponding to higher Mach numbers, and less pressure recovery at higher Mach numbers, and lower cavity pressure which leads to less pressure recovery at higher Mach numbers. Oftentimes, the iodine injection/mixing/dissociation function and the nozzle for accelerating the gas to Mach 2 are combined in the same piece of hardware, since the dissociation zone is best kept small.

The three most difficult issues related to COIL devices are (1) the avoidance of liquid BHP carryover (which scatters laser light and produces deleterious water vapor) with the reactor effluent, (2) the low pressure recovery which results in a large exhaust vacuum system, and (3) achievement of high overall efficiency (defined in terms of the ratio of laser power output to $Cl_2$ gas input).

Direct substitution of nitrogen diluent for the usual helium diluent in a COIL device reactor producing singlet delta oxygen generator results in a low flow capacity due to the effects of higher gas density leading to carryover of the liquid basic hydrogen peroxide into the laser cavity. As a consequence, it is necessary to significantly reduce the throughput of the laser device. Furthermore, the high gas density requires a lower gas flow velocity to avoid liquid carryover. The low velocity leads to decay of the singlet delta oxygen before it reaches the laser cavity. The net result is reduction by almost 50% in total flow capacity, and a further reduction of approximately 50% in laser efficiency. The same device, thus produces only about ¼th the total laser power.

OBJECTS AND SUMMARY OF THE INVENTION

It is therefore a principal object of the present invention to provide a COIL gain generator system which efficiently converts chemical energy to optical energy.

Another object is to achieve such efficient conversion in a compact, lightweight overall system.

Yet another object is to reduce the operating costs of COIL gain generator systems.

Still another object is to provide a COIL gain generator system, the effluent of which can be pumped by a chemical pump.

These and other objects are achieved by the present invention which includes a reactor for producing singlet delta oxygen and means for mixing high momentum diluent with the singlet delta oxygen and with iodine for producing a high momentum, low static temperature mixture of the singlet delta oxygen, diluent and iodine. The singlet delta oxygen and the iodine react to produce excited iodine atoms which can lase efficiently due to the low static temperature and can, after lasing, recover to high pressure in a diffuser due to the high momentum of the mixture.

The present invention provides the capability of using a chemical pump which allows a completely sealed system with no outside exhaust.

Other objects, advantages and novel features of the present invention will become apparent from the following detailed description of the invention when considered in conjunction with the accompanying drawings.

BRIEF DESCRIPTION OF THE DRAWING

The sole FIGURE is a schematic representation of a preferred embodiment of the COIL gain generator of the present invention.

DETAILED DESCRIPTION OF THE PREFERRED EMBODIMENT

Referring now to the drawings and the characters of reference thereon, the sole figure illustrates a preferred embodiment of the present invention, designated generally as 10. The COIL gain generator system 10 includes a reactor, designated generally as 12. The reactor 12 includes a chlorine manifold 14 and a BHP manifold 16 for introducing gaseous chlorine 15 and liquid BHP 17, respectively, to a reactor chamber 18. The chlorine manifold 14 is typically a perforated plate (not shown) for providing uniform disbursement of chlorine. The gaseous chlorine contains little or no diluent which helps avoid liquid BHP carryover out of the reactor 12. The BHP manifold 16 typically includes an orifice plate (not shown) which disperses the BHP into jets or droplets, thus providing a high liquid surface area for reaction with chlorine to produce singlet delta oxygen. The reactor chamber 18 typically has a larger cross-sectional area than downstream components so that the gas velocity is low enough to avoid carryover of liquid BHP into the downstream components. The BHP liquid surface area per unit volume in the reactor chamber 18 is kept as high as practical to promote fast reaction of the chlorine with the BHP and short residence time of singlet delta oxygen product.

The singlet delta oxygen product from the reactor chamber 18 is passed through an array of supersonic nozzles 20. (It is not actually passed in the nozzles 20, but is instead passed through spaces between exterior surfaces of the nozzles 20.) A high pressure mixture 21 of gaseous diluent and iodine is passed through the nozzles 20. The diluent has a high molecular weight, i.e., greater than 4. It preferably comprises nitrogen; however, other suitable diluents may be used, such as argon, neon, fluorocarbons, or mixtures of the above, with lighter weight species, such as helium or hydrogen to form a high average molecular weight mixture. As the diluent flows through the nozzles 20 it accelerates to a Mach number >3.5, typically around 5.0. The iodine can be either premixed with the diluent, as shown in FIG. 1, or introduced through separate orifices slightly upstream or slightly downstream of the nozzles 20.

In the mixing zone 22 downstream of the nozzles 20 the diluent, iodine and singlet delta oxygen are intimately mixed. This mixing is facilitated by nozzles 20 being closely spaced, with the singlet delta oxygen flowing therebetween. They are generally spaced about 0.1 to 1-inch apart. Simultaneous with the mixing process, the iodine is disassociated into iodine atoms by reaction with the singlet delta oxygen. As this process nears completion, the iodine atoms provide the laser gain needed to produce lasing. An aerodynamic disturbance element, such as an array of fine wires 24, may be used to initiate the reaction of the singlet delta oxygen and the iodine.

The high Mach number (>3) of the mixture maintains the static temperature (i.e., typically <175 Kelvin) to the low values needed for efficient lasing.

The mixture then flows into a laser cavity 26 where laser power is extracted from the mixture. Downstream of the laser cavity 26 the mixture flows into a supersonic/subsonic diffuser 28 which recovers pressure by converting the high momentum gas to a low momentum gas.

The amount of pressure recovered in the diffuser 28 is increased by the high average molecular weight (i.e., >10) and the high Mach number (i.e., >3) of the mixture.

The high recovered pressure allowed use of a relatively small exhaust pumping system. For a non-noble diluent, the pumping system could be a chemical pump.

EXAMPLE

A specific example of the subject system would include a reactor at 0.4 psia pressure flowing 1 gram mole per second of chlorine and 10 liters per second of BHP. The BHP would be flowed into the reactor through about 12000 very small orifices, creating 12000 jets of liquid BHP. Very little of the BHP would be reacted as it flows through the reactor. Residual BHP is drained continuously from the bottom of the reactor to be repeatedly recirculated through the reactor. The reactor would react approximately 90% of the chlorine, producing 0.9 moles per second of oxygen, of which about 60% would be in the singlet delta state, the remainder in the triplet sigma (ground) state. The mixture of oxygen and residual chlorine would approach the nozzle array at approximately Mach =0.4 and then accelerate to Mach=1 as it passes through the interstices between the array of nozzles. The nozzles, on approximately ½ inch centers, would flow a mixture of 5-gram moles per second of 373K stagnation temperature Nitrogen gas mixed with 0.02 moles per second of gaseous iodine. The nitrogen-iodine mixture would be supplied at 100 psia pressure to the nozzles. Upon passing through the nozzles, the nitrogen-iodine mixture would accelerate to Mach=5, as the pressure decreases to 0.2 psia. At the exit of the nozzles, the nitrogen-iodine mixture would meet the oxygen gas which at this point would be at Mach=1 and 0.2 psia. The nitrogen stream possesses the desired very high momentum, which is capable of accelerating the much lower momentum oxygen, when the streams are mixed. The nitrogen stream is also at very low static temperature, approximately 60K, as a result of its high Mach number, whereas the oxygen is much warmer at about 200K. As the two flows continue down the mixing region, the effects of diffusion and/or turbulence cause the nitrogen-iodine mixture to mix intimately with the oxygen. The mixture retains the high momentum from the nitrogen-iodine stream, so that the mixture is at a pressure of about 0.2 psia, Mach number of approximately 3.5 and a temperature of about 100K. The singlet delta oxygen reacts with molecular iodine, $I_2$, to produce iodine atoms, I. Should the molecular iodine have condensed into liquid iodine, or clusters of iodine molecules, a foreign object such as an array of wires introduces an aerodynamic disturbance. The aerodynamic disturbance produces a pressure and temperature spike, which vaporizes the liquid or clustered iodine and starts the reaction, which produces iodine atoms. After the iodine is dissociated, the rapid, near equilibrium transfer of energy between singlet delta oxygen and iodine atoms provides the laser gain at 1.315 microns wavelength. The mixture passes into the optical mode where 1.315-micron wavelength light is amplified by the laser gain of the flowing medium. It is expected that approximately 30 kilowatts of optical energy could be extracted from the flowing medium. After the laser energy has been extracted, the mixture flows out of the optical mode into the diffuser. The diffuser is a well known geometrical duct consisting of a constant area section approximately 12 duct heights long, followed by a 6 degree expanding section with exit height approximately 3 or 4 times the height of the constant area section. In the diffuser, the Mach=3.5 mixture at 0.2 psia is decelerated to about Mach=0.2 and a pressure of 2 to 3 psia. The high pressure at the exit of the duct simplifies the effort needed to pump the exhaust up to local atmospheric pressure where it can be scrubbed of toxic gases (iodine and residual chlorine) and the remaining non-toxic gases released to the atmosphere. Alternately, the exhaust can be absorbed in a sealed reactive or absorptive container. The latter is made possible by the absence of any noble gases such as helium, which normally cannot be absorbed by conventional sealed exhaust systems.

MORE EXAMPLES

The invention as described could use any convenient source of singlet delta oxygen other than the jet type reactor shown (e.g., rotating disk, spray reactor, or solid state reactor). The reactor gas flow could include some of the diluent along with the chlorine, if desired. The supersonic nitrogen-iodine nozzle array can be any array of nozzles other than the conical nozzles shown, for example, an array of two dimensional slit nozzles, an array of curved blade nozzles, or an array of base relief nozzles). The nozzles could include mixing aid devices such as boundary layer trips to enhance the rate of mixing. It is convenient to introduce the iodine premixed with the nitrogen, but it could also be introduced separately by a second set of subsonic, sonic or supersonic nozzles. The aerodynamic disturbance mentioned above could be a non-physical object such as a gas jet, or an electron beam, or it could be deleted entirely. The diffuser could be of different design; for example it could be combined with a supersonic-supersonic ejector to exhaust directly to the atmosphere in situations where toxic exhaust is not a problem.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A chemical oxygen iodine laser gain generator system, comprising:

a) a reactor for producing singlet delta oxygen; and b) means for mixing high momentum diluent with said singlet delta oxygen and with iodine for producing a high momentum, low static temperature mixture of the singlet delta oxygen, diluent and iodine, wherein the singlet delta oxygen and the iodine react to produce excited iodine atoms which can lase efficiently due to the low static temperature and can, after lasing, recover to high pressure in a diffuser due to the high momentum of the mixture.

2. The system of claim 1, wherein the singlet delta oxygen produced by the reactor is produced at a low pressure and low momentum.

3. The system of claim 1, wherein said high momentum diluent comprises a high molecular weight gas.

4. The system of claim 3, wherein said high molecular weight gas comprises a non-noble gas which can be evacuated by a chemical pump.

5. The system of claim 1, wherein said high momentum diluent comprises a diluent having a Mach number greater than 3.5 and a molecular weight greater than about 4.

6. The system of claim 1, wherein said high momentum, low static temperature mixture-produced has a Mach number greater than 3, an average molecular weight greater than 10 and a static temperature less than 175 Kelvin.

7. The system of claim 1, wherein said means for mixing high momentum diluent with said singlet delta oxygen and with iodine comprises means for premixing the diluent with iodine prior to dynamically mixing with the singlet delta oxygen.

8. The system of claim 1, wherein said diluent comprises gaseous nitrogen.

9. The system of claim 1, further comprising an aerodynamic disturbance element for initiating the reaction of the singlet delta oxygen and the iodine.

* * * * *